United States Patent
Ho

(10) Patent No.: US 7,699,025 B2
(45) Date of Patent: Apr. 20, 2010

(54) STRUCTURE OF FEEDER FOR SUPPLYING WATER AND PET FOOD

(75) Inventor: Ying-Kuan Ho, Tainan (TW)

(73) Assignee: Ying Yeeh Enterprise Ltd., Tainan (TW)

( * ) Notice: Subject to any disclaimer, the term of this patent is extended or adjusted under 35 U.S.C. 154(b) by 85 days.

(21) Appl. No.: 12/181,451

(22) Filed: Jul. 29, 2008

(65) Prior Publication Data

US 2010/0024735 A1    Feb. 4, 2010

(51) Int. Cl.
*A01K 5/00* (2006.01)
*A01K 7/00* (2006.01)

(52) U.S. Cl. ......................................... 119/51.5; 119/72

(58) Field of Classification Search ................. 119/454, 119/464, 475, 515, 521, 52.1, 61.5, 72.5, 119/51.5, 72; *A01K 5/00, 7/00*
See application file for complete search history.

(56) References Cited

U.S. PATENT DOCUMENTS 3,730,141 A * 5/1973 Manning et al. ........... 119/51.5
5,345,892 A * 9/1994 Khan ......................... 119/51.5
6,142,099 A * 11/2000 Lange, Jr. .................. 119/51.5
6,318,290 B1 * 11/2001 Fisher ........................ 119/51.5
6,739,284 B1 * 5/2004 Olive ........................... 119/74
7,284,499 B1 * 10/2007 Kuster ....................... 119/51.5
2006/0096545 A1 * 5/2006 Cone et al. ............... 119/61.53
2008/0202436 A1 * 8/2008 Romeu Guardia ......... 119/52.1
2009/0260575 A1 * 10/2009 Wechsler .................... 119/52.1

* cited by examiner

*Primary Examiner*—Son T Nguyen
*Assistant Examiner*—Shadi Baniani
(74) *Attorney, Agent, or Firm*—Alan Kamrath; Kamrath & Associates PA

(57) ABSTRACT

An improved structure of a feeder for supplying water and pet food is disclosed. Therein, a base has a shifting space adjacent to a side of a bowl settled in the base so as to receive a dispensing controller. A container unit equipped with a hopper and a water supplier is provided on top of the dispending controller. The dispensing controller can be shifted in the shifting space so that an opening limit is formed when projections formed on two rear ends of the dispensing controller abut against blocks provided bilaterally in the shifting space, and a closing limit is formed when a groove of the dispensing controller abuts against a stop plate formed at a rear section of the shifting space. Thus, the container unit can be easily opened to dispense pet food or closed to not dispense pet food.

1 Claim, 5 Drawing Sheets

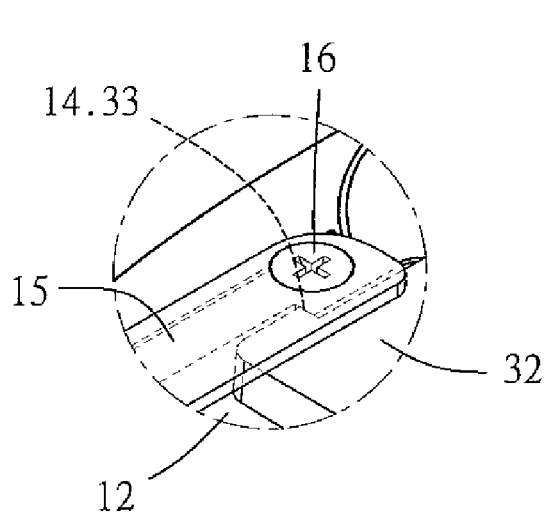
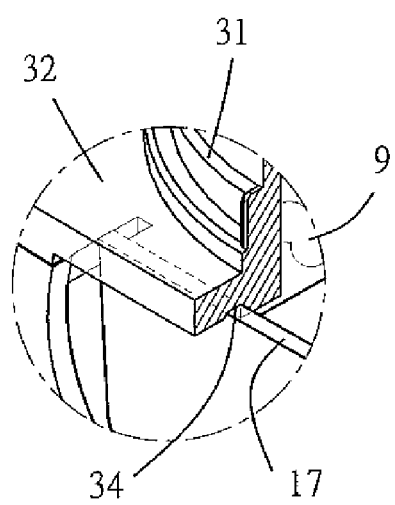
FIG. 6D                FIG. 7E
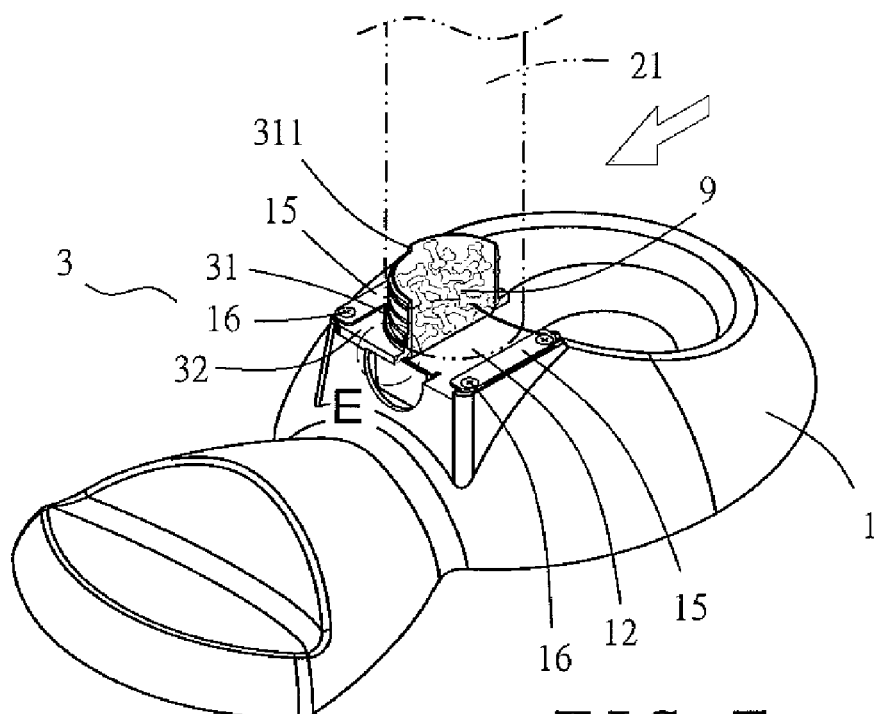
FIG. 7

STRUCTURE OF FEEDER FOR SUPPLYING WATER AND PET FOOD

BACKGROUND OF THE INVENTION

1. Technical Field

The present invention relates to an improved structure of a feeder for supplying water and pet food. More particularly, the present invention relates to a control design of a feeder containing pet food (for dogs, cats and the like) so that the feeder, when used outdoors, can be easily operated to dispense or not dispense the pet food.

2. Description of Related Art

Devices for timely supplying food and water to pets (such as cats, dogs and the like) in an outdoor setting have various configurations. For example, an improved structure of a feeder for supplying water and pet food was proposed by the inventor of the present invention previously, wherein pet food is poured into the feeder through a hopper and stored in a container unit. The level of pet food in a transparent inner tube can be observed through a through slot on an outer tube. When feeding is not necessary, the outer tube can be rotated so that a knob connected to a lower end of the outer tube is simultaneously rotated. As a result, a dispensing outlet on the knob is closed to a connecting portion of a base. When feeding is desired, the outer tube can be rotated so that the dispensing outlet on the knob corresponds to the connecting portion of the base, thereby allowing the pet food to fall smoothly into a bowl settled in the base and be eaten by pets.

BRIEF SUMMARY OF THE INVENTION

The present invention provides a novel design of a pet food dispensing control mechanism for use in a feeder assembly of the aforementioned type, with the aim that a feeder loaded with pet food can be easily controlled in an outdoor setting so as to dispense or not dispense pet food.

A primary objective of the present invention is to provide an improved structure of a feeder for supplying water and pet food, wherein a container unit has an upper end penetratingly coupled with a mounting seat and further connected to an end of a hopper, and a lower end coupled to a base. The container unit includes an inner tube having a lower end connected with a dispensing controller. The dispensing controller comprises a hollow coupling section having an end formed as a base portion for being received in a shifting space formed on the base adjacent to a side of a bowl settled in the base. The shifting space is provided bilaterally with guiding ledges each having an upper end covered with a limiting element secured in place by threaded fasteners. Each of the guiding ledges further has an end adjacent to the bowl formed with a block on an inner side of each said guiding ledge. When the base portion of the dispensing controller is shifted towards the bowl, projections at two rear ends of the base portion of the dispensing controller abut against the blocks to form an opening limit. The base portion of the dispensing controller further has a rear edge whose underside is formed with a groove in communication with outside. When the dispensing controller is closed, the groove abuts against a stop plate formed in the shifting space to form a closing limit. Thus, the container unit can be easily opened to dispense pet food or closed to not dispense pet food.

BRIEF DESCRIPTION OF THE SEVERAL VIEWS OF THE DRAWINGS

The invention as well as a preferred mode of use, further objectives and advantages thereof will best be understood by reference to the following detailed description of an illustrative embodiment when read in conjunction with the accompanying drawings, wherein:

FIG. 1A is an enlarged view of an encircled portion A in FIG. 1;

FIG. 1B is an enlarged view of an encircled portion B in FIG. 1;

FIG. 1C is an enlarged view of an encircled portion C in FIG. 1;

FIG. 6D is an enlarged view of an encircled portion D in FIG. 6;

FIG. 7 is a partially sectional view of the assembly of the container unit and the base according to the present invention, wherein the container unit is being closed; and FIG. 7E is an enlarged view of an encircled portion E in FIG. 7.

DETAILED DESCRIPTION OF THE INVENTION

Figure 1:
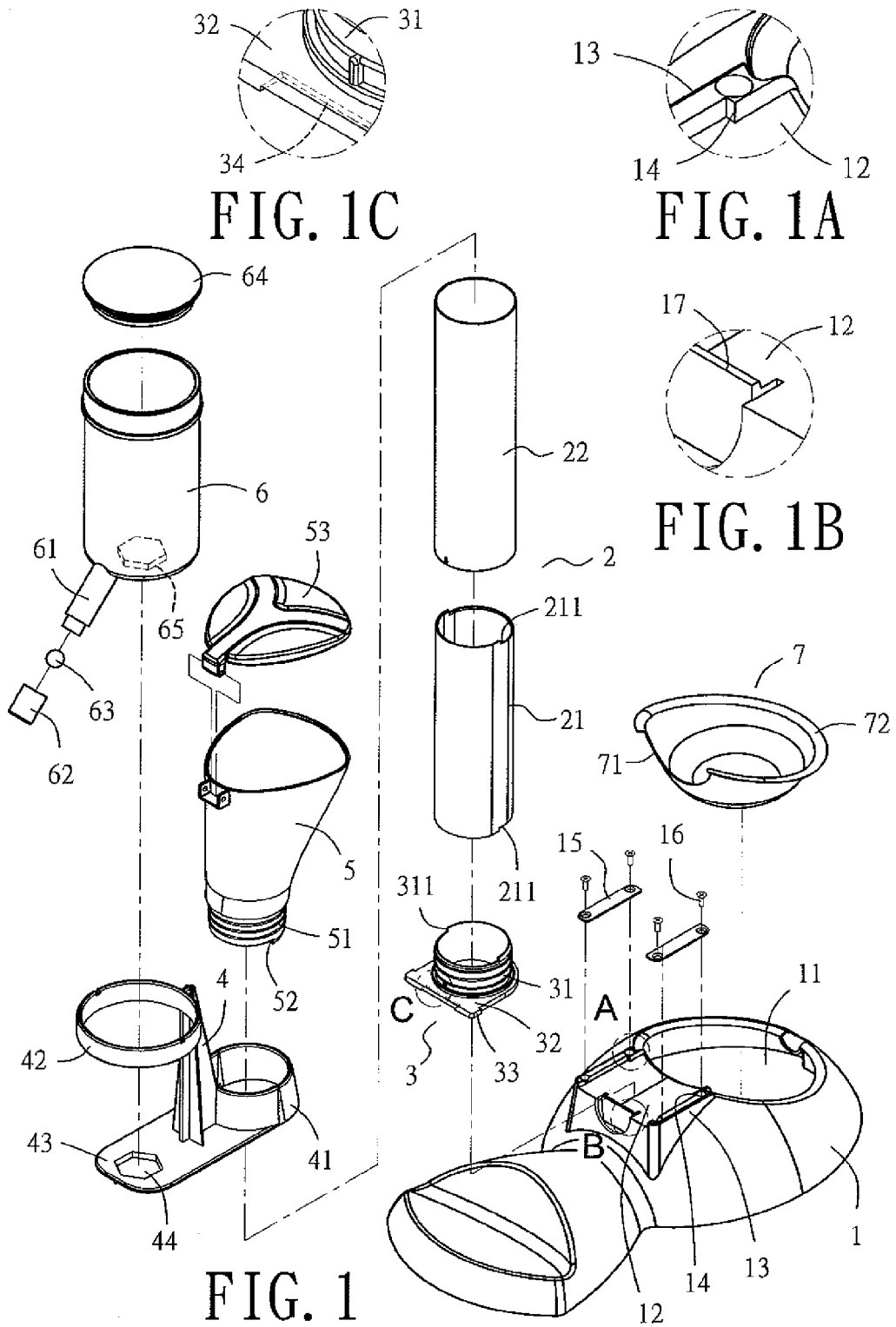
FIG. 1 is an exploded view of a feeder according to the present invention.
Figure 2:
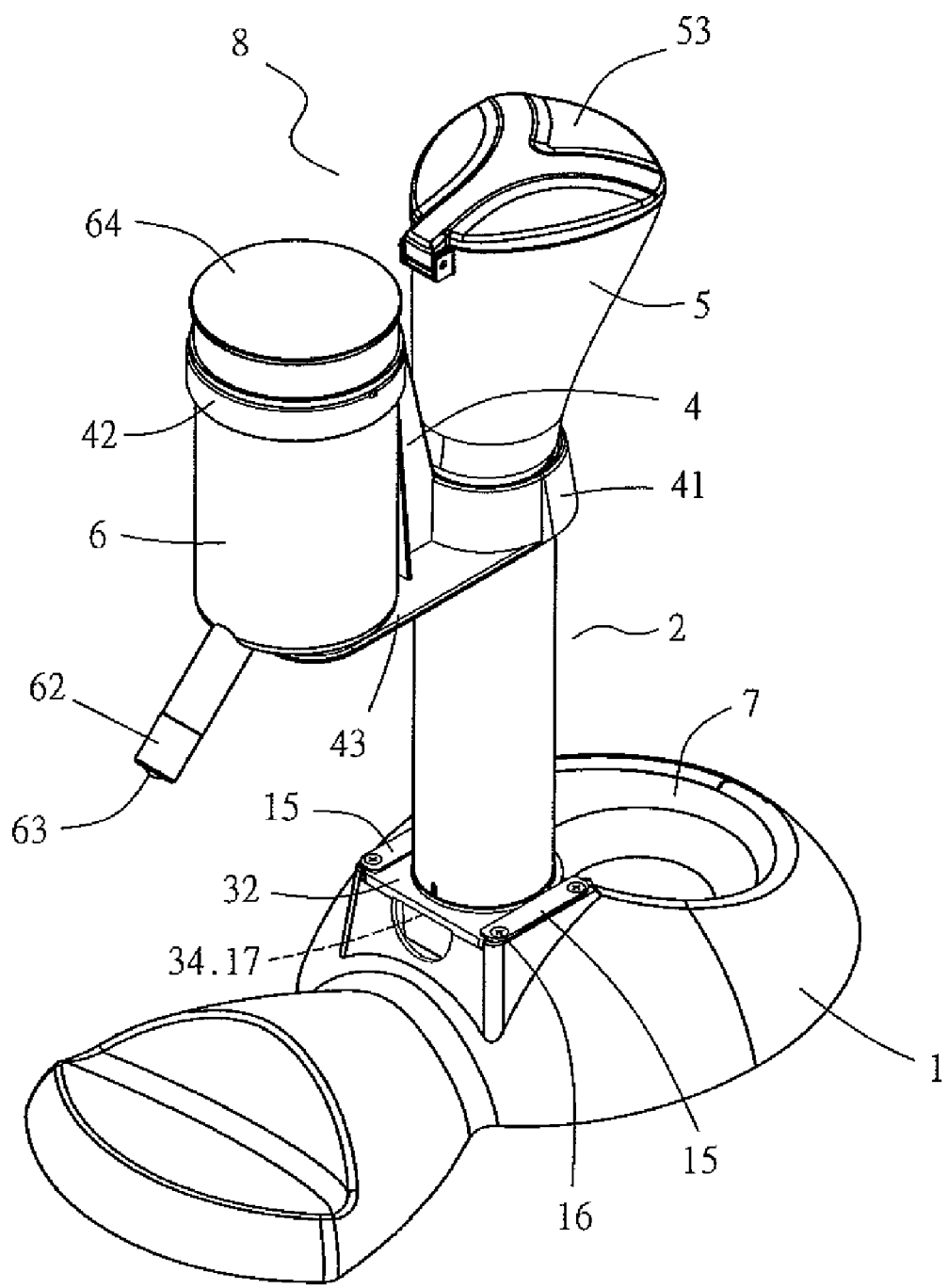
FIG. 2 is a perspective view of the feeder according to the present invention.

Referring to FIGS. 1 and 2, an improved structure of a feeder for supplying water and pet food according to the present invention comprises a base 1, a container unit 2 including an inner tube 21 and an outer tube 22, a dispensing controller 3, a mounting seat 4, a hopper 5, a water supplier 6 and a bowl 7.

The base 1 has a front half court formed with a receiving cavity 11. A shifting space 12 is formed adjacent to a side of the receiving cavity 11. The shifting space 12 is bilaterally formed with guiding ledges 13 each having an end adjacent to the receiving cavity 11 provided with a block 14, and an upper end covered with a limiting element 15 secured in place by threaded fasteners 16, so that the limiting element 15 and the corresponding guiding ledge 13 are connected as one piece. In addition, the shifting space 12 has a rear section protrudingly formed with a stop plate 17.

The container unit 2, as mentioned earlier, includes the inner and outer tubes 21 and 22. The inner tube 21 is made of a transparent material and has an upper end and a lower end, each end formed with a recessed section 211. The outer tube 22 has a side formed with a through slot (not shown).

The dispensing controller 3 is correspondingly installed at the lower end of the inner tube 21 of the container unit 2 and has a hollow coupling section 31 and an end formed as a base portion 32 for being received in the shifting space 12, which is formed on the base 1 adjacent to the side of the receiving cavity 11. The base portion 32 has two rear ends each formed with a projection 33. The base portion 32 further has a rear edge formed on an underside thereof with a groove 34 in communication with outside. In addition, the hollow coupling section 31 has an upper end formed with a recessed section 311.

The mounting seat 4 has a first half court formed with a taper coupling portion 41 for being fitted over an upper end of the outer tube 22 of the container unit 2. (A reduced upper section of the coupling portion 41 is shaped according to an outer diameter of the outer tube 22.) The mounting seat 4 has a second half court, whose upper part and lower part are formed with supporting portions 42 and 43, respectively, for supporting the water supplier 6 therein. The water supplier 6 has a bottom formed with an engaging portion 65 for mating with an engaging hole 44 in the supporting portion 43, thereby preventing the water supplier 6 from spinning in the supporting portion 42. (In the embodiment shown, both the engaging portion 65 and the engaging hole 44 are hexagonal.)

The hopper 5 has a lower tube section 51 shaped according to an inner diameter of the outer tube 22 of the container unit 2. A recessed section 52 is formed on a lower periphery of the tube section 51 for joining side by side with the recessed section 211 on the upper end of the inner tube 21 of the container unit 2. A lid 53 is pivotally coupled to a side of an upper end of the hopper 5.

The water supplier 6, serving as container for supplying drinking water, is connected between the upper and lower supporting portions 42 and 43 at the second half court of the mounting seat 4, and has an outlet tube 61 fitted with a movable element 62. A steel ball 63 installed inside the movable element 62 serves as an outlet device which blocks water flow when not pushed inwards, but allows water to flow out when pushed inwards, so that a pet can drink from the water supplier 6. In addition, the water supplier 6 has an upper end covered fittingly with a lid 64.

The bowl 7 has an side formed as a connecting portion 71 for abutting against a peripheral portion at the side of the receiving cavity 11 of the base 1. The bowl 7 further has a periphery formed with a flange 72 which allows the bowl 7 to be stably settled in the receiving cavity 11 of the base 1.

Figure 3:
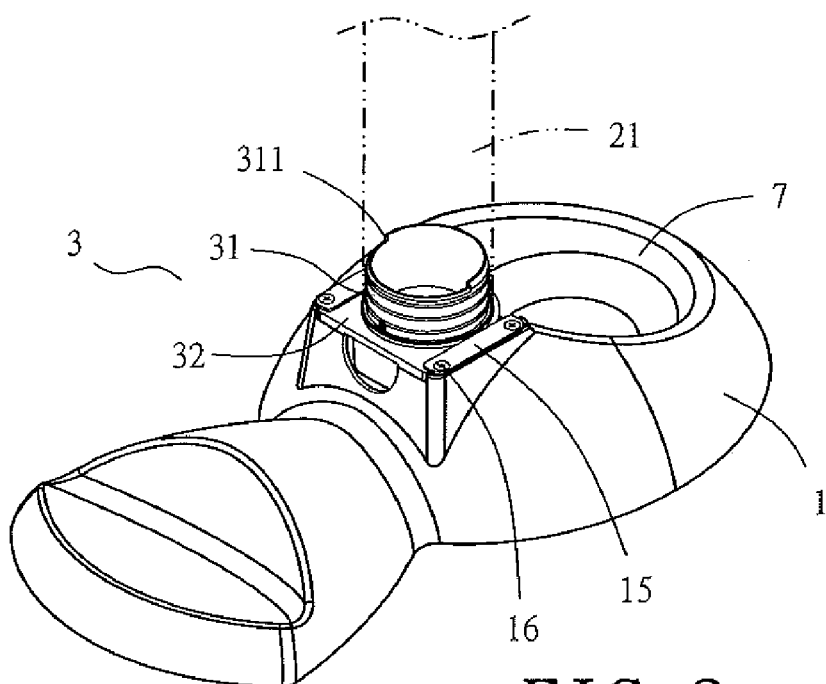
FIG. 3 is a partial view of an assembly of a container unit and a base according to the present invention, wherein the container unit is closed.

Referring to FIGS. 1 to 3, in order to assemble a feeder 8 having the improved structure of the present invention, the recessed section 211 at the lower end of the inner tube 21 of the container unit 2 is coupled side by side with the recessed section 311 of the hollow coupling section 31 of the dispensing controller 3. Then, the base portion 32 formed at the end of the coupling section 31 of the dispensing controller 3 is placed into the shifting space 12 of the base 1. Following that, the upper ends of the guiding ledges 13 formed bilaterally in the shifting space 12 are covered with the limiting elements 15 and coupled therewith by the threaded fasteners 16 so as to form a single piece, thereby retaining the dispensing controller 3. Next, the taper coupling portion 41 of the mounting seat 4 is fitted over the outer tube 22 of the container unit 2. The lower tube section 51 of the hopper 5 is then inserted into the outer tube 22 of the container unit 2, so that the recessed section 52 on the lower periphery of the tube section 51 is joined side by side with the recessed section 211 at the upper end of the inner tube 21. Thereafter, the water supplier 6 is disposed between the upper and lower supporting portions 42 and 43 of the mounting seat 4. Finally, the bowl 7 is put in the receiving cavity 11 of the base 1, so that the connecting portion 71 of the bowl 7 corresponds to a part of the receiving cavity 11 adjacent to the shifting space 12. Thus, the feeder 8 is completely assembled.

Figure 4:
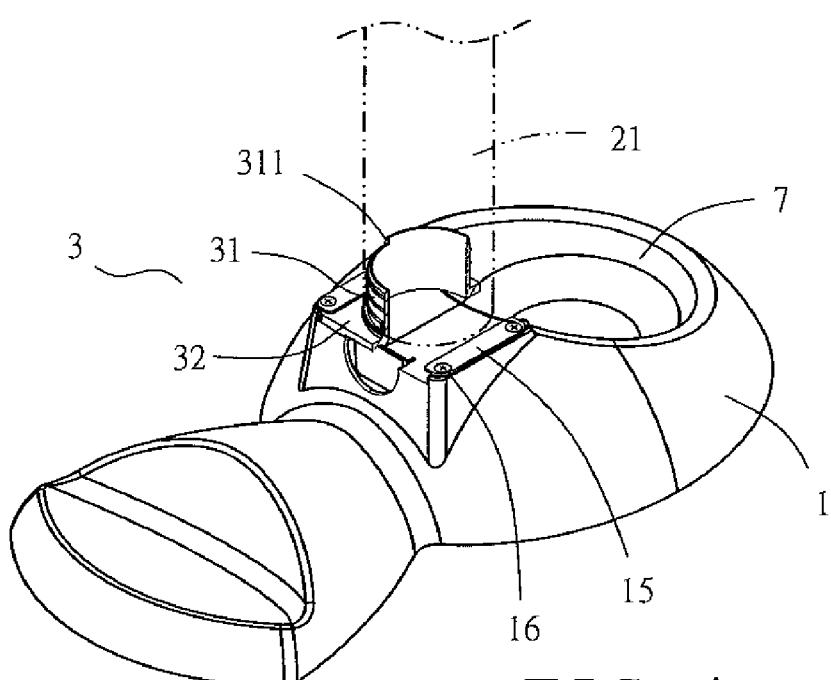
FIG. 4 is a partially sectional view of the assembly of the container unit and the base according to the present invention, wherein the container unit is closed.

Referring to FIGS. 2 to 4, when it is desired to close the container unit 2 of the feeder 8, the dispensing controller 3 is shifted away from the receiving cavity 11 of the base 1, so that the groove 34 formed on the underside of the rear edge of the base portion 32 abuts against the stop plate 17 of the shifting space 12, thereby forming a closing limit and preventing the dispensing controller 3 from coming off.

Figure 5:
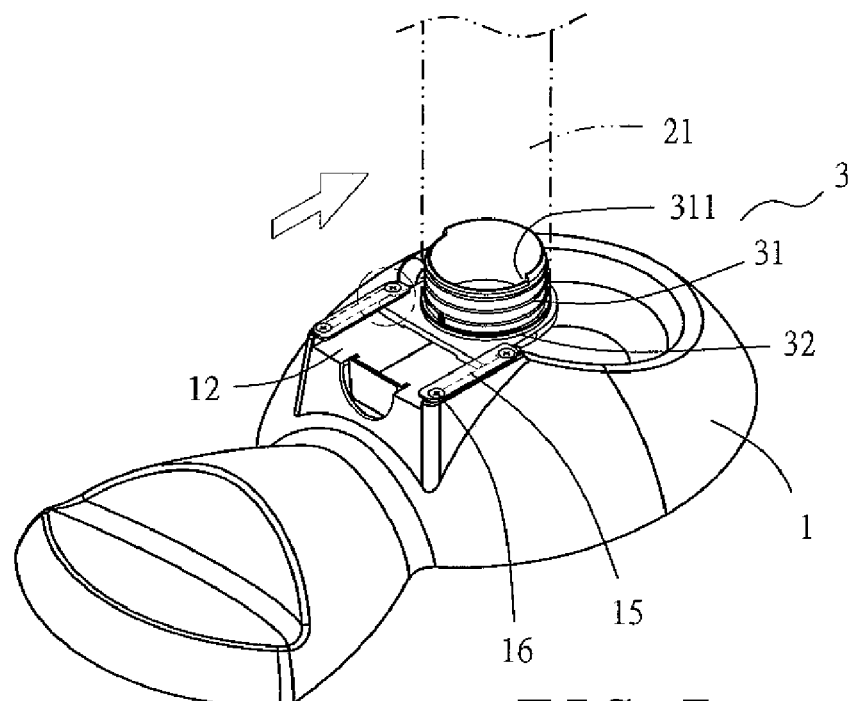
FIG. 5 is a partial view of the assembly of the container unit and the base according to the present invention, wherein the container unit is being opened.
Figure 6:
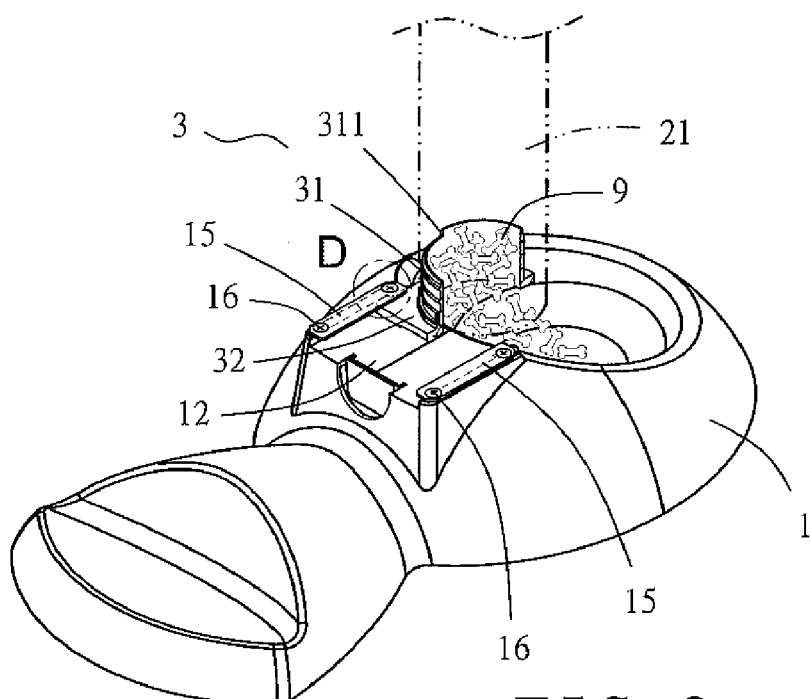
FIG. 6 is a partially sectional view of the assembly of the container unit and the base according to the present invention, wherein the container unit is opened.

Referring now to FIGS. 5 and 6, when it is necessary to open the container unit 2 of the feeder 8, the container unit 2 assembled with the dispensing controller 3 at a lower end thereof is pushed towards the receiving cavity 11 of the base 1. The base portion 32 of the dispensing controller 3 can be moved to a side of the shifting space 12 of the base 1 that is adjacent to the receiving cavity 11 (as shown in FIG. 6) so that the projections 33 formed at the two rear ends of the base portion 32 of the dispensing controller 3 abut against the blocks 14 provided bilaterally in the shifting space 12 (as shown in FIG. 6D), thereby form an opening limit. At this time, the lower end of the inner tube 21 of the container unit 2 corresponds to the bowl 7 settled in the base 1 so as to enter a dispensing state, in which pet food 9 stored in the container unit 2 is allowed to fall into the bowl 7.

When pet food fallen into the bowl 7 is sufficient and it is necessary to close the container unit 2, the entire container unit 2 is pushed away from the receiving cavity 11 of the base 1 (in a direction indicated by the arrow in FIG. 7), so that the groove 34 formed on the underside of the rear edge of the base portion 32 once again abuts against the stop plate 17 of the shifting space 12 (as shown in FIG. 7E). Thus, the container unit 2 is closed with a simple operation and stops dispensing the pet food 9 stored therein.

The container unit 2 assembled in the feeder 8 has the following advantages regarding the way it is opened to dispense pet food and closed to discontinue dispensing pet food:

1. The container unit, which is coupled at the lower end thereof with the dispensing controller, can be easily opened or closed by being shifted towards or away from the receiving cavity of the base, thereby allowing the inner tube of the container unit to either correspond to the bowl settled in the base so that the container unit is opened to dispense pet food, or be blocked by the shifting space so that the container unit is closed to not dispense pet food.

2. The components of the container unit can be conveniently coupled with the dispensing controller, which is disposed beneath the container unit, so as to achieve the preset function of switching the container unit between an opened state and a closed state.

3. All the components for controlling the switching of the container unit between the opened state and the closed state can be easily processed to effectively lower the production cost of the components.

The invention claimed is:

1. An improved structure of a feeder for supplying water and pet food, comprising a base assembled with a container unit having an upper end penetratingly coupled with a mounting seat supporting a water supplier, wherein the upper end of the container unit is further coupled with a hopper and forms a single piece therewith, and the base has a front half court provided with a bowl so as to form a feeder, the improved structure being characterized in that:

the container unit connected between the mounting seat and the base comprises an inner tube having a lower end coupled with a dispensing controller, wherein the dispensing controller has a hollow coupling section having an end formed as a base portion for being received in a shifting space formed on the base adjacent to a side of the bowl, the shifting space being provided bilaterally with guiding ledges, each said guiding ledge having an upper end covered with a limiting element secured in place by threaded fasteners, each said guiding ledge further having an end adjacent to the bowl formed with a block on an inner side of each said guiding ledge so that when the base portion of the dispensing controller is shifted towards the bowl, projections at two rear ends of the base portion of the dispensing controller abut against the blocks to form an opening limit, in which the base portion of the dispensing controller further has a rear edge whose underside is formed with a groove so that when the dispensing controller is closed, the groove abuts against a stop plate in the shifting space to form a closing limit;

wherein the container unit can be easily opened to dispense pet food or closed to not dispense pet food.

* * * * *